(12) United States Patent
Schmidt et al.

(10) Patent No.: US 7,975,964 B2
(45) Date of Patent: Jul. 12, 2011

(54) AIRPLANE WING, METHOD FOR MANUFACTURING AN AIRPLANE WING AND USE OF A WELDING PROCESS FOR WELDING A WING SPAR

(75) Inventors: Hans-Juergen Schmidt, Buxtehude (DE); Jens Telgkamp, Buxtehude (DE)

(73) Assignee: Airbus Operations GmbH, Hamburg (DE)

( * ) Notice: Subject to any disclaimer, the term of this patent is extended or adjusted under 35 U.S.C. 154(b) by 43 days.

(21) Appl. No.: 12/621,870

(22) Filed: Nov. 19, 2009

(65) Prior Publication Data

US 2010/0065534 A1    Mar. 18, 2010

Related U.S. Application Data

(62) Division of application No. 11/297,612, filed on Dec. 7, 2005, now Pat. No. 7,641,147.

(60) Provisional application No. 60/633,958, filed on Dec. 7, 2004.

(30) Foreign Application Priority Data

Dec. 7, 2004 (DE) .......................... 10 2004 058 910

(51) Int. Cl.
B64C 3/18 (2006.01)
(52) U.S. Cl. ...................................................... 244/123.1
(58) Field of Classification Search .............. 244/123.1, 244/123.3, 123.7
See application file for complete search history.

(56) References Cited

U.S. PATENT DOCUMENTS

| | | | | |
|---|---|---|---|---|
| 1,720,698 A | * | 7/1929 | Staiger | 244/105 |
| 1,808,842 A | * | 6/1931 | Fedor | 244/123.12 |
| 2,567,124 A | * | 9/1951 | Roberts | 244/124 |
| 4,749,155 A | * | 6/1988 | Hammer et al. | 244/123.7 |
| 6,450,394 B1 | * | 9/2002 | Wollaston et al. | 228/112.1 |
| 6,712,315 B2 | * | 3/2004 | Schmidt et al. | 244/117 R |
| 6,786,452 B2 | * | 9/2004 | Yamashita et al. | 244/123.1 |
| 2001/0052561 A1 | * | 12/2001 | Wollaston et al. | 244/132 |

* cited by examiner

Primary Examiner — Tien Dinh
(74) Attorney, Agent, or Firm — Ingrassia Fisher & Lorenz, P.C.

(57) ABSTRACT

An airplane wing has a lower wing cover, an upper wing cover and a wing spar. A first end portion of the wing spar is welded to the lower wing cover and/or a second end portion of the wing spar is welded to the upper wing cover.

3 Claims, 2 Drawing Sheets

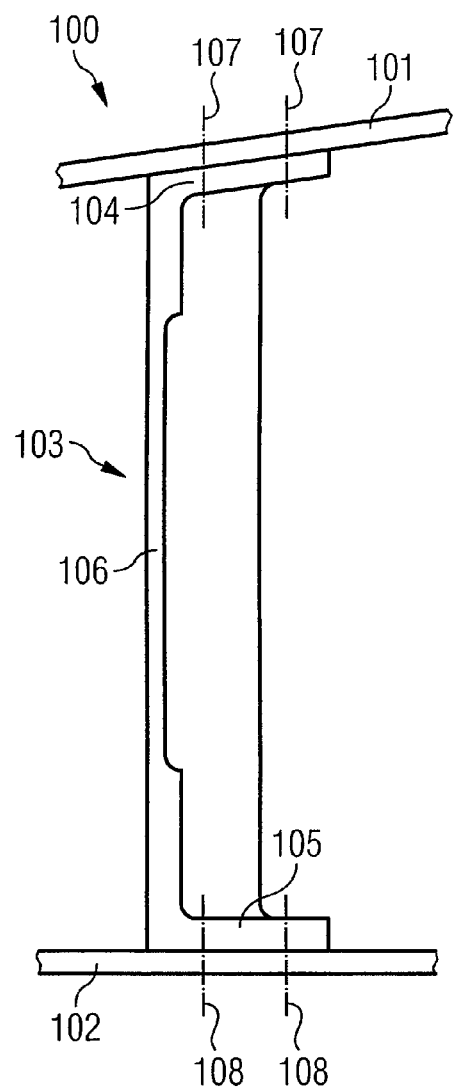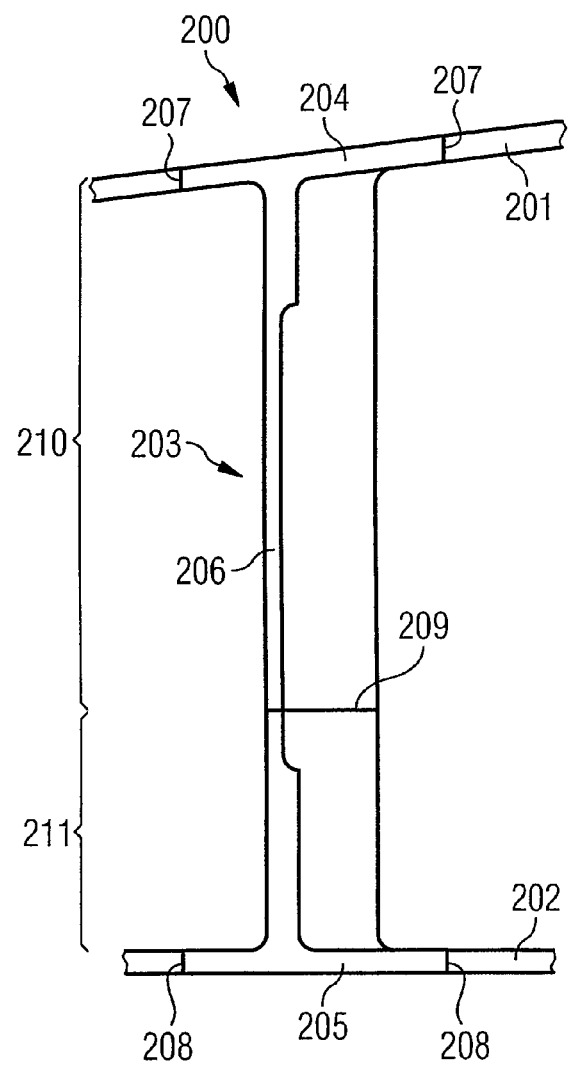
FIG 1
Prior Art
FIG 2

AIRPLANE WING, METHOD FOR MANUFACTURING AN AIRPLANE WING AND USE OF A WELDING PROCESS FOR WELDING A WING SPAR

CROSS REFERENCE TO RELATED APPLICATIONS

This is a division of U.S. patent application Ser. No. 11/297,612, filed Dec. 7, 2005, which claims the benefit of the filing date of U.S. Provisional Patent Application No. 60/633,958 filed Dec. 7, 2004, and which claims the foreign priority of German Patent Application No. 10 2004 058 910.0 filed Dec. 7, 2004 in the names of Hans-Juergen Schmidt and Jens Telgkamp and entitled AIRPLANE WING, METHOD FOR MANUFACTURING AN AIRPLANE WING AND USE OF A WELDING PROCESS FOR WELDING A WING SPAR, the disclosures of which are incorporated by reference herein.

FIELD OF THE INVENTION

This invention relates to an airplane wing, a method for manufacturing an airplane wing and use of a welding process for welding a wing spar.

TECHNOLOGICAL BACKGROUND

A wing of an airplane usually comprises a lower wing cover, an upper wing cover, and at least one wing spar spanning the lower wing cover with the upper wing cover. Such a wing spar is frequently composed of a top chord and a bottom chord as well as a middle web therebetween. Such a spar is connected at the top chord side to the upper wind cover and at the bottom chord side to the lower wing cover.

When constructing the interface area between wing spar and wing covers, a plurality of design criteria have to be considered, such as static strength, deformation behavior, stability, crack initiation and crack growth properties, residual strength, corrosion resistance, controllability, and various production aspects.

Conventionally, a wing spar is connected to the wing covers by means of single to three row rivet joints or by means of threaded joints. It is also known from the state of the art to secure a wing spar to wing covers by using an adhesive joint. The wing covers start before a front spar connection for receiving a wing tip and end after a rear spar connection by forming the wing box for securing wing flaps.

Wing covers and wing spars have numerous thickness gradations in view of reaching minimum weight while meeting sophisticated strength requirements and maintainability requirements, like controllability or repairability. In particular for large transport airplanes, the spars are frequently integrally milled from an aluminum blank, whereas for smaller airplanes, the spars are frequently produced in differential style.

Hereafter, with reference to FIG. 1, an airplane wing 100 according to the state of the art is described.

The airplane wing 100 comprises an upper wing cover 101 and a lower wing cover 102, wherein the upper wing cover 101 is spanned with respect to the lower wing cover 102 by means of a wing spar 103. The wing spar 103 comprises a top chord 104, a bottom chord 105 and a middle web 106 arranged therebetween. The top chord 104 is connected to the upper wing cover 101 by means of a threaded joint 107. The bottom chord 105 is connected to the lower wing cover 102 by means of another threaded joint 108. The wing spar 103 is a wing spar with rib connection. As an alternative to the threaded joint 107, 108, a riveted joint can also be provided.

The connecting technique known from the state of the art for connecting the wing spar to the wing covers has considerable disadvantages. A short incipient crack durability results from high load transmission from the spar chords into the wing covers in case of wing bending or wing torsion. The single to three row rivet joints or threaded joints, which extend in wing span direction, generate high production costs, which are further increased through required durability increasing measures (e.g. plastic expansion of bores before insertion of the connecting elements).

Frequently, the chords of the spars are the components having the lowest durability, with possible cracks in general growing perpendicularly to the spar direction. Locating this crack configuration through external visual controls is frequently impossible, so that internal cost-intensive wing controls are necessary for damages to be detected in good time. Once the spar chord is broken, in many cases the required design loads (limit loads) can no longer be transmitted.

The riveted or threaded joint between wing spar and wing covers requires doubling and weight disadvantages resulting therefrom.

SUMMARY OF THE INVENTION

It is an object of the present invention to provide a connection between a wing spar and wing covers, which has high mechanical stability and can be manufactured at low cost.

This problem may be solved by an airplane wing, a method for manufacturing an airplane wing, and the use of a welding process for welding a wing spar, having the characteristics according to the independent patent claims.

The inventive airplane wing has a lower wing cover, an upper wing cover, and a wing spar. A first end portion of the wing spar is welded to the lower wing cover, and/or a second end portion of the wing spar is welded to the upper wing cover.

In the inventive method for manufacturing an airplane wing, a first end portion of a wing spar is welded to a lower wing cover and/or a second end portion of the wing spar is welded to an upper wing cover.

Moreover, according to the invention, the use of a welding process for welding a wing spar to an upper wing cover and/or a lower wing cover is provided.

Thus, the invention provides an optimized welding termination of the connection between a wing spar and one or both of the wing covers. Such improvement and simplification in manufacturing technique fulfill increasing requirements with respect to performance and cost in the manufacturing or flight operation of future airplane structures. The production method provided according to the invention for a connection between a wing spar and wing covers by means of welding offers new possibilities for increasing efficiency as well as reducing costs and weight in the connecting area between wing spar and wing covers.

With the inventive solution, which is optimized regarding strength, weight and production cost, wing spars can be made from milled double T profiles. Four flanges of such a double T profile can be butt connected to the wing covers by appropriate welding processes. I.e. the front flange of the front spar can be connected to the slat junction, the rear flange of the front spar and the front flange of the rear spar to the center wing cover, and the rear flange of the rear spar to the end box.

The spar(s) can be made from two different materials, which take into account the dimensioning load types. A lower chord and an adjacent web area of a wing spar can be provided from an aluminum alloy optimized with respect to a damage tolerance behavior, whereas for a top chord and a (remaining) web area adjacent thereto, an aluminum alloy with high static strength can be used. Both spar parts can be connected to each other by welding. Preferred are processes which can properly connect different alloys to each other, in particular friction stir welding (FSW). Also, a fusion welding process (e.g. laser beam welding, LBW) can be implemented.

Through the welded joint of the spar flanges to the wing covers, durability critical rivet joints and threaded joints can be avoided. This leads to an extension of the durability of the aircraft or to a significant increase in admissible design stresses, and therefore to weight saving. Possible damages due to material fatigue, corrosion, or artificial damage in the connecting area can be detected by external and thus low-cost visual checks.

The use of different aluminum alloys for the bottom chord areas or for the top chord areas allows for optimal material utilization while taking into account local dimensioning criteria.

Additional weight savings result from the fact that doublings in the interface area between wing spar and wing covers can be omitted, as according to the invention, the spar chords can be provided as part of the wing covers (i.e. integrated therein).

A particular saving potential is due to using an appropriate welding process. E.g. a laser welding process, a friction stir welding process, or an electron beam welding process can be implemented particularly advantageously as a replacement of the previous cost-intensive rivet joints or threaded joints.

Further embodiments of the invention result from the dependent claims.

Hereafter, embodiments of the inventive airplane wings are described. These embodiments are also applicable for the method for manufacturing an airplane wing, and for the use of a welding process for welding a wing spar.

The wing spar can have a cross-section, which is substantially double T-shaped, or can have a cross-section, which is substantially C-shaped. In both instances, the components extending perpendicularly to the web allow for a sufficiently large connecting surface with a lower wing cover or an upper wing cover, so that a high strength and yet low-cost welded joint can be formed.

Furthermore, the airplane wing can have (at least) one additional wing spar. The wing spar can be arranged as a front spar, or the additional wing spar can be arranged as the rear spar, wherein the wing spar and the additional wing spar (e.g. in double T-shaped configuration) can have front flanges and rear flanges, respectively. The front flanges of the front spar can be connected to a slat junction, wherein the rear flanges of the rear spar can be connected to an end box. The rear flanges of the front spar and the front flanges of the rear spar can be connected to a center portion of the lower wing cover and the upper wing cover.

The welded first end portion of the wing spar can be part of the lower wing cover. Alternatively or additionally, the welded second end portion of the wing spar can be part of the upper wing cover. Thus, a respective end portion of the wing spar can be integrated in the corresponding wing cover and thus form a particularly sturdy connection. This further allows for visual control of possible damages to be performed from the outside, as according to the invention, the wing spar can be provided as part of the lower wing cover or the upper wing cover.

The wing spar can be made from one type of material (i.e. from a single material), whereby additional cost advantages are obtained.

Alternatively, the wing spar can have a first section of a first material and a second section of a second material, wherein the first material can be different from the second material. Thereby, a wing spar of two types of material (or of several types of material) can be welded into the airplane wing, with different regions of the spar being composed of different materials. Therewith, the material selection for different components can be performed specifically for each function, i.e. adapted to special functions of different sections. Thus, e.g. one section can be optimized with respect to a damage tolerance behavior, whereas another section can be optimized for a connection with high static strength.

The first section can have a bottom chord of the wing spar and a portion of a wing spar web, adjacent to the bottom chord. The second section can have a top chord of the wing spar and a portion of the wing spar web, adjacent to the top chord.

The first section and the second section can be manufactured from two different aluminum alloys, which can be adapted or optimized for the different load types of the different spar portions.

The first section can be welded to the second section. In other words, an advantageous welded joint can be used for increasing stability and reducing manufacturing costs, even for manufacturing a welded joint between different sections of a spar of two or several types of material (i.e. of at least three materials).

The inventive airplane wing can have at least one additional wing spar, wherein a first end portion of each of the at least one additional wing spar is welded to the lower wing cover and/or a second end portion of each of the at least one additional wing spar is welded to the upper wing cover. Thus, the invention is also applicable to an airplane wing having several wing spars (e.g. two or three).

DESCRIPTION OF THE DRAWINGS

Sample embodiments of the invention are represented in the figures and are further explained hereafter.

FIG. 1 shows an airplane wing according to the state of the art.

FIG. 2 shows an airplane wing according to a first sample embodiment of the invention.

Identical or similar components in different figures carry the same reference numbers.

Figure 3:
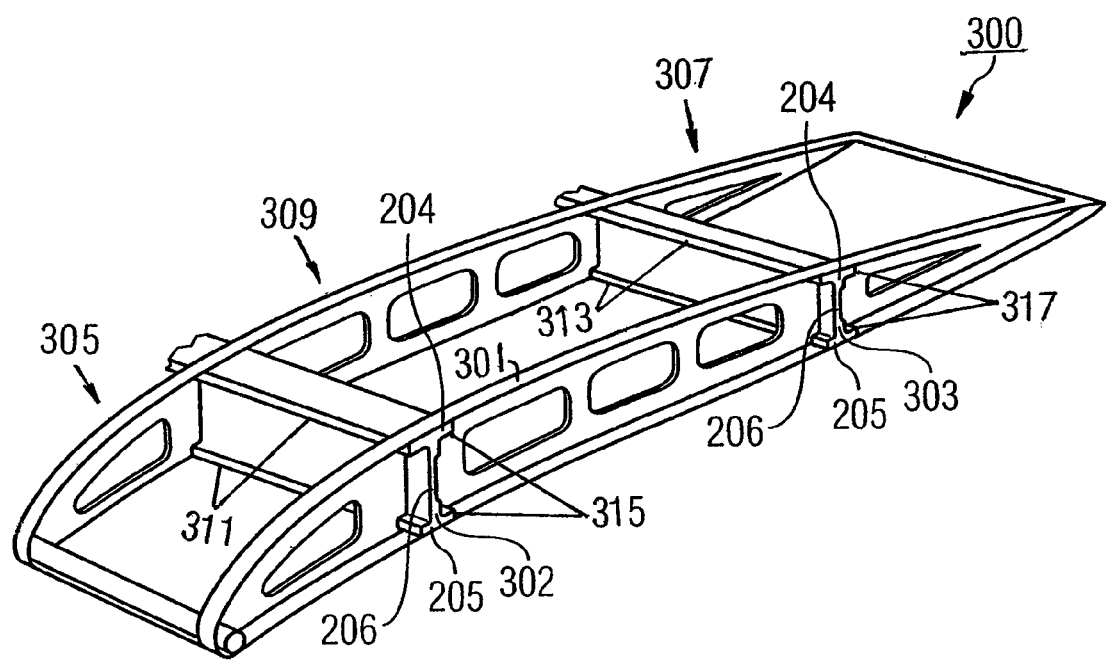
FIG. 3 shows an airplane wing according to a second sample embodiment of the invention.

The illustrations in the figures are schematic and not to scale.

A table of reference numbers is included at the end of the specification.

DETAILED DESCRIPTION OF EXEMPLARY EMBODIMENTS

Hereafter, with reference to FIG. 2, an airplane wing 200 according to a first exemplary embodiment of the invention is described.

The airplane wing 200 comprises a lower wing cover 202, an upper wing cover 201, and a wing spar 203. A lower end portion of the wing spar 203 is welded to the lower wing cover 202 by means of a welded joint 208. An upper end portion of the wing spar 203 is welded by means of a welded joint 207 to the upper wing cover 201.

The wing spar 203 has a cross-section that is substantially double T-shaped. In the sample embodiment according to FIG. 2, the welding between the wing spar 203 and the wing covers 201, 202 is made such that the welded lower end portion of the wing spar 203 is part of the lower wing cover 202 and the welded upper end portion of the wing spar 203 is part of the upper wing cover 201, so that the wing spar 203 is integrated in the upper wing cover 201 or in the lower wing cover 202.

The wing spar 203 has an upper wing spar portion 210 and a lower wing spar portion 211, which are manufactured from different materials. The lower wing spar portion 211 is composed of an aluminum alloy, which is optimized with respect to the damage tolerance behavior. Whereas the upper wing spar portion 210 is composed of an aluminum alloy with high static strength, which is optimized for good mechanical stability.

The upper wing spar portion 210 comprises a top chord 204 and a portion adjacent to the top chord 204 of a middle web 206 of the wing spar 203. The lower wing spar portion 211 comprises a bottom chord 205 and a portion adjacent to the bottom chord 205 of the middle web 206 of the wing spar 203. The upper wing spar portion 210 is welded to the lower wing spar portion 211 at a connecting point by means of a welded joint 209.

For forming the welded joints 207 to 209, according to the described exemplary embodiment, a laser welding process, a friction stir welding process, an electron beam welding process or another welding process may be used. At least for connecting the upper and the lower parts (weld seam 209), friction stir welding may be advantageous, as this process has good qualities when welding different alloys.

Hereafter, with reference to FIG. 3, an airplane wing 300 according to a second sample embodiment of the invention is described.

In the airplane wing 300, the upper wing cover and the lower wing cover are not shown, in order to better illustrate the geometry of two wing spars 302 and 303.

The airplane wing 300 has a front spar 302 and a rear spar 303, which are secured to a wing rib 301 and are substantially formed in double T-shape.

Based on the arrangement shown in FIG. 3, subsequently a lower wing cover (not shown) is welded to bottom chords 205 of the spars 302, 303, and an upper wing cover (not shown) is welded to top chords 204 of the wing spars 302, 303. In the airplane wing 300, there is thus provided a front spar 302 and a rear spar 303 separate therefrom.

FIG. 3 further illustrates slat junction 305, end box 307, and center wing cover 309. Also, flanges 311 and 315 of front spar 302 and flanges 313 and 317 of rear spar 303 are shown.

The invention is not limited to the preferred exemplary embodiments illustrated in the figures. Rather a plurality of modifications can be envisaged, which make use of the illustrated solution and the inventive principle even in embodiments of basically different types.

Additionally, it is to be noted that "having" does not exclude other elements or steps, and "one" does not exclude a plurality. Furthermore, it is to be noted that characteristics or steps, which have been described with reference to one of the sample embodiments above, can also be used in combination with other characteristics or steps of other sample embodiments described above. Reference symbols in the claims are not to be considered as limitations.

REFERENCE LIST 100 airplane wing
101 upper wing cover
102 lower wing cover
103 wing spar
104 top chord
105 bottom chord
106 middle web
107 threaded joint
108 threaded joint
200 airplane wing
201 upper wing cover
202 lower wing cover
203 wing spar
204 top chord
205 bottom chord
206 middle web
207 welded joint
208 welded joint
209 welded joint
210 upper wing spar portion
211 lower wing spar portion
300 airplane wing
301 wing rib
302 front spar
303 rear spar
305 slat junction
307 end box
309 center wing cover
311 front flange
313 front flange
315 rear flange
317 rear flange What claimed is:

1. A method for manufacturing an airplane wing comprising:
providing a lower wing cover and an upper wing cover,
providing a wing spar comprising a first end portion and a second end portion, each of the first end portion and the second end portion respectively comprising a front flange and a rear flange,
butt welding the front flange and the rear flange of the first end portion of the wing spar to the lower wing cover; such that the welded first end portion of the wing spar comprises a part of the lower wing cover and forms a butt welded part of an outside of the airplane wing,
butt welding the front flange and the rear flange of the second end portion of the wing spar to the upper wing cover, such that the welded second end portion of the wing spar comprises a part of the upper wing cover and forms a butt welded part of the outside of the airplane wing.

2. The method of claim 1, further comprising:
utilizing a butt welding process for butt welding the wing spar to at least one of the upper wing cover and the lower wing cover.

3. The method according to claim 2, further comprising:
as the butt welding process, utilizing one of the group composed of a laser beam welding process, a friction stir welding process, and an electron beam welding process.

* * * * *